Dec. 30, 1930.  E. M. HEIDORN  1,787,110
ANTITHEFT LOCK FOR AUTOMOBILES
Filed Aug. 8, 1929  2 Sheets-Sheet 1
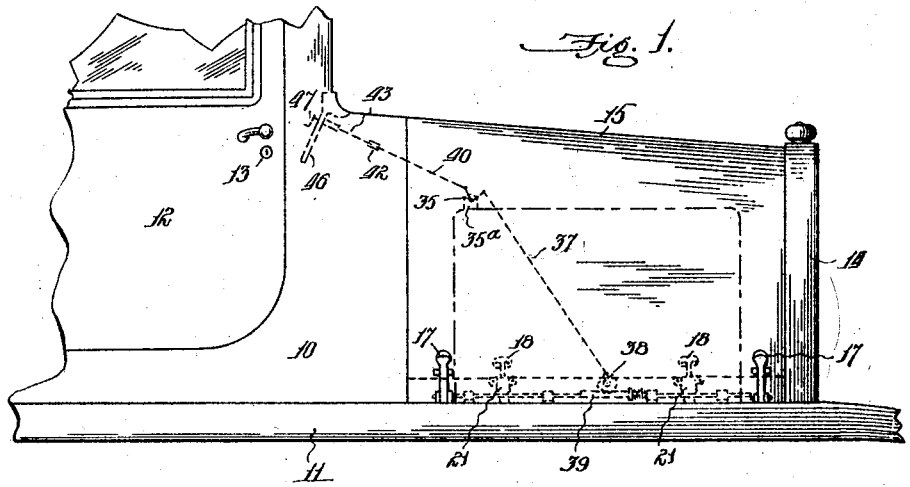
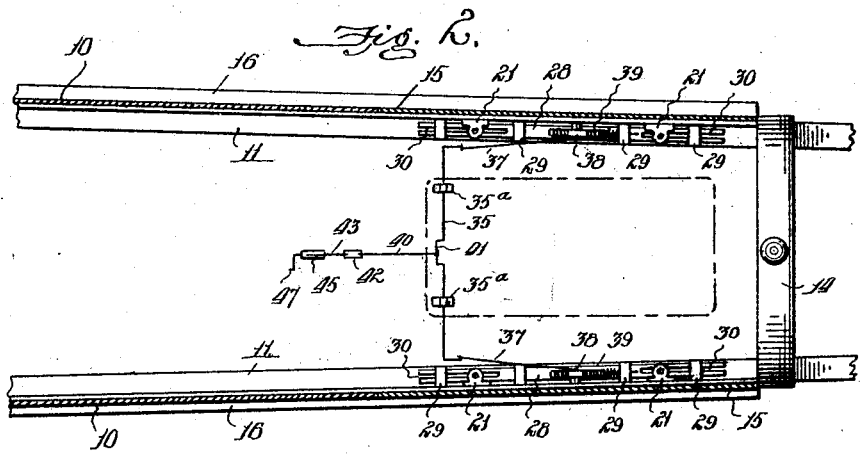
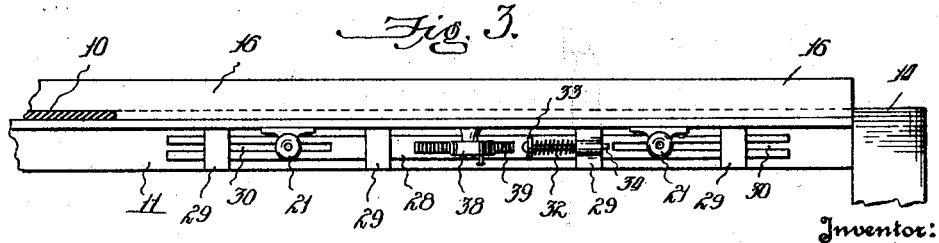
Inventor:
Edward M. Heidorn.
By John D Thomas & Co
Attorneys.

Dec. 30, 1930.                E. M. HEIDORN                1,787,110
                       ANTITHEFT LOCK FOR AUTOMOBILES
                    Filed Aug. 8, 1929            2 Sheets-Sheet 2
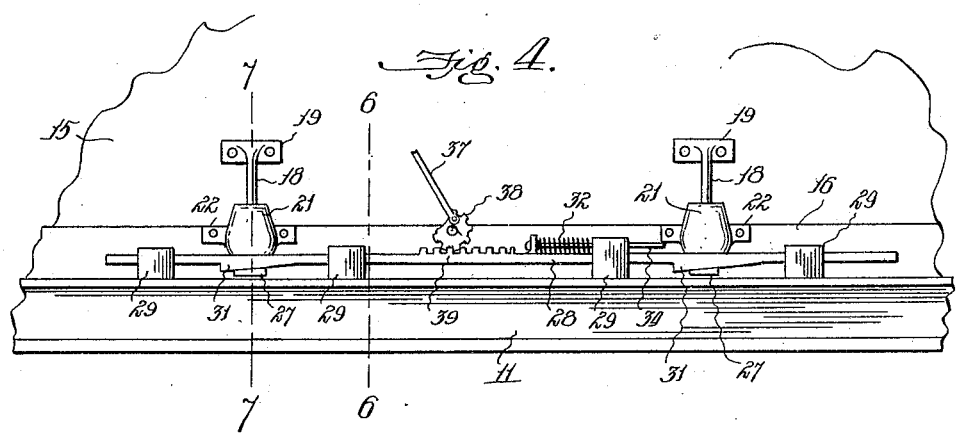
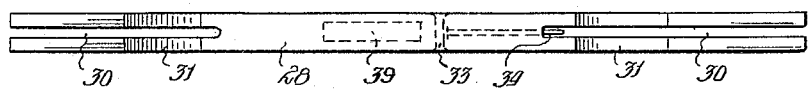
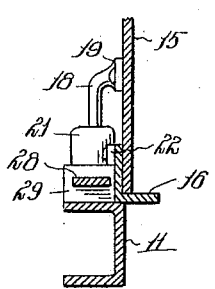 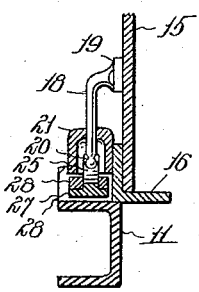 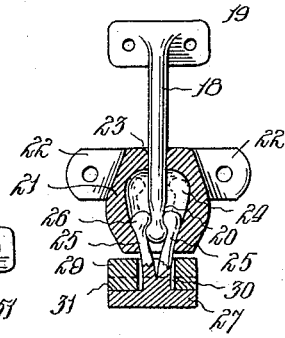
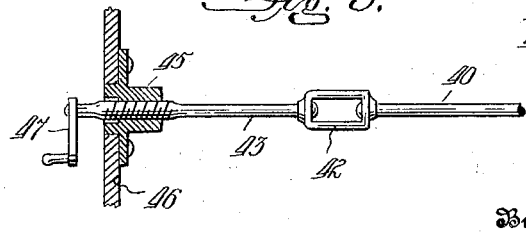 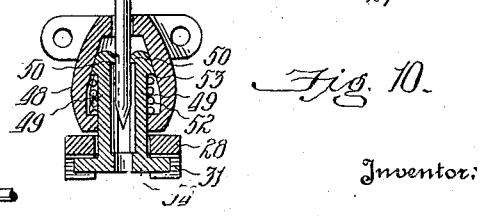
Inventor:
Edward M. Heidorn.
By John D. Thomas Co.
Attorneys.

Patented Dec. 30, 1930

1,787,110

UNITED STATES PATENT OFFICE

EDWARD M. HEIDORN, OF HILLSIDE, ILLINOIS

ANTITHEFT LOCK FOR AUTOMOBILES

Application filed August 8, 1929. Serial No. 384,311.

My invention is an improvement in locking devices for protecting automobiles and other closed motor cars against theft, and relates more especially to that particular type which is employed for locking the hood to prevent access to mechanical appliances encased therein which may be easily removed and stolen.

When an automobile of the closed type is left unattended it is usual to protect it against theft by locking the doors leading into the body of the car and thus prevent access to the starting and steering mechanism, and in many instances the hood being left unlocked permits a thief who may be balked in stealing the automobile to resort to petty thieving by removing mechanical devices or parts which are essential to the operation of the automobile thus not only putting the owner to the expense of replacing the parts but making it impossible to run the automobile until such parts are replaced.

It is the principal object of my invention therefore to provide an effective locking means for the hood of an automobile which can be readily installed and operated only from the inside of the closed car, whereby the locking of the doors leading into the body of the car to prevent theft of the automobile will also protect against the operation of the locking means for the hood.

A further object of my invention is to provide a locking means of this general character which will be simple in construction, positive in operation, and in which the operating means for releasing the sides of the hood can be readily and conveniently manipulated.

With these principal objects in view my invention consists in the particular construction and arrangement of parts, as hereinafter fully described and more specifically set forth in the appended claims.

In the accompanying drawings forming a part of this specification:

Figure 1 is a side elevation of the forward part of an automobile with my improved form of hood lock and operating means therefor indicated in dotted lines.

Fig. 2 is a plan view of the forward part of the chassis, showing the application of the locking devices.

Fig. 3 is an enlarged plan view of the locking mechanism at one side of the hood.

Fig. 4 is an elevation of the locking mechanism.

Fig. 5 is a detail plan view of the plate for operating the clutches.

Figs. 6 and 7 are detail sectional views on the lines 6—6 and 7—7 of Fig. 4.

Fig. 8 is a sectional view through one of the clutches.

Fig. 9 is a detail view of the operating rod, and

Fig. 10 is a sectional view showing a modification of the clutch.

Like numerals of reference indicate like parts in the several views of the drawings.

My improved hood lock is designed for use in connection with the closed type of automobile as illustrated in Fig. 1 in which the body 10 is mounted on the chassis frame bars 11 and provided with the usual doors 12 each supplied with a lock (not shown) operated in any suitable manner as for instance by a key inserted in key hole 13, the forward part of the chassis carrying radiator 14 and hood 15, the latter covering the engine (indicated in dotted lines) and other parts of the mechanism as well as accessories common to a well equipped automobile. As usual the hood is in two parts hinged at their upper ends and folded downwardly against longitudinal angle plates 16 attached to the frame bars of the chassis, and the two sections of said hood held in closed position by hooks 17, though of course these hooks are not essential when the parts of the hood are provided with my improved locking means, and of course the hood sections may have the usual hand grips (not shown) for raising and lowering the same.

In carrying out my invention each hinged portion of the hood is provided on the inner side thereof with spaced apart locking-bolts or rods 18, 18, depending from attaching plates 19 by which they are rigidly secured to the hood, said locking-bolts or rods being pointed at their lower ends and provided with peripheral grooves 20 above said pointed ends, for the purpose hereinafter explained. The locking-bolts or rods 18 at opposite sides of the hood cooperate with clutches secured to the inner side of the angle plates 16 on the chassis for locking both sides of the hood in place, and as the four clutches are similar a description of one will apply to the others, like numerals of reference being used. I prefer the form of clutch illustrated in detail in Fig. 8 of the drawings, consisting of a casing 21 having attaching ears 22 by which it is rigidly secured to the angle plate 16, said casing being provided with a vertical opening through the same the upper part 23 of said opening forming a passage for the locking-bolt or rod into the enlarged lower portion 24 which contains the clutch members or jaws 25, 25, between which the rounded end of the locking-bolt passes to be gripped by said jaws, for which purpose the free ends of the latter are provided with opposing teeth 26 which engage the groove 20 in the locking-bolt. The clutch members or jaws 25 are formed integrally with an operating member 27 and said jaws are of spring metal and normally separated to receive and release the locking-bolt when they are in uppermost position in the clutch-casing, being closed on the locking-bolt when moved downward by the contracted end of the opening 24. It will be understood that the clutches 25 secured to the chassis are in vertical line with the companion locking-bolts or rods carried by the sections of the hood, so that when said sections are lowered the locking-bolts will enter the clutches, and for operating both clutches at either side of the hood a long narrow plate 28 is slidably mounted in bearings 29 on the frame bars of the chassis, said plate having slots 30 through which the jaws of the clutches pass with the operating member or head 27 located below the plate to be engaged by an inclined surface or cam 31 acting to move the jaws into locked engagement with the bolt. The plates which operate the gripping jaws of the clutches are automatically moved to locked position by means of an expansion spring 32 interposed between one of the bearing-brackets and an abutment 33 on the plate, said spring being held in place by a rod 34 projecting from the abutment and slidable in the aforementioned bearing-bracket, as shown in the drawings.

The plates at the opposite sides of the hood are moved against the action of the springs for releasing the bolts by means of devices operated from within the body of the automobile, this operating mechanism in the present instance comprising a crank-shaft 35 mounted across the rear end of the engine in brackets 35ª with the crank-arms 36 connected by rods 37 to pinions 38 at each side of the hood supported by the angle-plate 16 and in mesh with rack-teeth 39 formed on said plate, an operating-rod 40 being connected to the crank 41 at the center of said shaft and extending through the instrument board of the automobile within easy reach of the driver. Suitable means may be provided for working the rod and for holding it in the operation of the crank-shaft, the preferred form being shown in Fig. 9 of the drawings in which said rod is connected by swivel 42 to an extension rod 43 having a threaded portion 44 turning in the hub of a bracket 45 secured to the instrument-board 46 and at its inner end provided with a crank-handle 47, whereby it is only necessary to turn the crank-handle for moving the sectional operating-rod back and forth; it being understood that when said sectional rod is drawn upon by turning the screw-rod clockwise in the manipulation of the handle the crank-shaft will operate the pinions 38 through the link connections 37 to move the plates 28 forward so that the cams 31 on the underside thereof will pull down on the clutch-members or jaws 25—25 to grip the locking bolts 18, as shown in full lines Fig. 8, and that when the operating-rod is turned counter-clockwise to relieve pull on links 37 springs 32 will act automatically to move the plates in the other direction and release the clutch-members as the small end of each cam is in position to engage the operating member 27 of the clutch, as indicated in dotted lines in said Fig. 8 of the drawings.

From the foregoing description, in connection with the accompanying drawings, the construction and operation of my improved locking means will be readily understood, for the operating-shaft or screw-rod being manipulated to lock the cover sections forming the hood the locking of the doors leading into the car will prevent said cover sections being raised and thus prevent the engine from being tampered with or the parts enclosed being stolen. Furthermore, by the particular construction of the locking mechanism in cooperation with the screw-rod for operating the same the clutch-members will be acted upon by the plates to pull down on the locking-bolts and clamp the hood firmly and securely in closed position against rattling as well as being opened without access being first had to the body of the car.

The hood locking device in accordance with my invention can be readily installed at comparatively small expense, and being positive in operation, as well as durable in construction, provides an effective arrangement of this kind for the protection of an automobile when it is left unattended, and when access to the engine is desired by the owner or an authorized person it is necessary only to turn the screw-rod counter-clockwise sufficiently to have the cams release the spring-actuated clutch-members.

The modification in Fig. 10 of the drawings shows a different form of the clutch, in this instance the opening through the casing 48 being contracted at its upper end so that the clamping of the jaws 49—49 is effected by an upward movement of said jaws, the latter having gripping teeth 50 which bite into the depending bolt 51, and are spring actuated to close on said bolt by spring 52 interposed between shoulders 53 on the jaws and lower end of the opening through the casing. In this instance the cam 31 operates member 54 to open the jaws for releasing the bolt when the plates are moved forwardly by clockwise movement of the handle 47 and are actuated by the spring 52 for gripping the bolt when the plates are moved rearwardly by springs 32 on counter-clockwise movement of the crank handle, the jaws being spaced apart for practically their full length so that the bolt can enter to a more or less extent and thereby accommodate the closed position of the hood. In this instance also a plain bolt is used instead of a headed bolt as shown in Fig. 8, as the gripping action of the jaws is caused by their riding upwardly on the converging side walls of the opening in the casing, and consequently the greater the pull on the rod the greater the gripping action of said bolts, the bolt being pointed at its end so as to enter between the free ends of the jaws.

I claim:—

1. A hood locking mechanism for automobiles comprising depending bolts secured to the cover sections forming the hood, clutches secured to the chassis and having jaws adapted to engage said bolts, slidable plates engaging the jaws for moving them in and out of locked engagement with the bolts, and means for moving the plates operated from within the body of the automobile.

2. A hood locking mechanism for automobiles comprising depending bolts secured to the cover sections forming the hood, clutches secured to the chassis and each consisting of a casing having an opening therein contracted at one end with separable jaws extending into the casing through the contracted opening to engage the bolts carried by the hood; slidable plates engaging the jaws for moving them towards each other for gripping the aforesaid bolts, and means for sliding the plates operated from within the body of the automobile.

3. A hood locking mechanism for automobiles comprising depending bolts secured to the cover sections forming the hood, clutches secured to the chassis and having spring-actuated jaws adapted to engage the bolts, slidable plates for moving the jaws in one direction, said jaws being spring-actuated in the other direction, and means for operating the plates extending into the body of the automobile.

4. A hood locking mechanism for automobiles comprising depending bolts secured to the cover sections forming the hood, clutches secured to the chassis for engaging the bolts and each consisting of a casing having a vertical opening therethrough contracted at one end, spring actuated jaws extending upwardly into the opening and normally separated in the enlarged portion of said opening, and an operating member connecting the lower ends of said jaws; together with a slidable plate having a cam surface engaging said operating member of the jaws, and means for sliding the plate extending into the body of the automobile.

5. A hood locking mechanism for automobiles comprising depending bolts secured to the cover sections forming the hood, clutches secured to the chassis for engaging the bolts, operating members on said clutches, and sliding plates at opposite sides of the chassis for operating the clutches; together with means for sliding the plates comprising a crank-shaft, connections between the crank-shaft and plates, a rod connected to the crank-shaft, an operating screw-rod connected to said rod by a swivel, and a bracket having a threaded opening through which the screw-rod passes, the inner end of the screw-rod having a crank-handle for turning the same.

6. A hood locking mechanism for automobiles comprising depending bolts secured to the cover sections forming the hood, clutches secured to the chassis for engaging the bolts and each consisting of a casing having a vertical opening therethrough contracted at one end, spring metal jaws extending upwardly into the opening and adapted to be normally separated in the enlarged portion of said opening, and an operating member connecting the lower ends of said jaws; together with slidable plates at opposite sides of the chassis, cam surfaces on the underside of said plates for operating the clutches and rack-teeth on the upper side thereof, pinions in mesh with the rack-teeth, a crank-shaft connected to the pinions, and an operating rod connected to the crank-shaft and extending into the body of the automobile.

EDWARD M. HEIDORN.